(12) United States Patent
Desai et al.

(10) Patent No.: US 12,230,927 B2
(45) Date of Patent: Feb. 18, 2025

(54) CABLE GLAND WITH TORQUE SENSOR

(71) Applicant: Eaton Intelligent Power Limited

(72) Inventors: Jayram Shivajirao Desai, Kolhapur (IN); Himanshu Gangadhar Khokle, Nagpur (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 284 days.

(21) Appl. No.: 18/053,024

(22) Filed: Nov. 7, 2022

(65) Prior Publication Data

US 2023/0148404 A1 May 11, 2023

Related U.S. Application Data

(60) Provisional application No. 63/263,849, filed on Nov. 10, 2021.

(51) Int. Cl.
| | | |
|---|---|---|
| *H01R 13/66* | (2006.01) | |
| *H01R 4/10* | (2006.01) | |
| *H01R 24/00* | (2011.01) | |
| *H02G 15/013* | (2006.01) | |
| *H02G 15/02* | (2006.01) | |

(52) U.S. Cl.
CPC .......... *H01R 13/6683* (2013.01); *H01R 4/10* (2013.01); *H01R 24/00* (2013.01); *H02G 15/013* (2013.01); *H02G 15/025* (2013.01)

(58) Field of Classification Search
CPC .......... H01R 4/10; H01R 24/00; H01R 13/00; H01R 13/66; H01R 13/6683; H02G 15/013; H02G 15/025
See application file for complete search history.

(56) References Cited

U.S. PATENT DOCUMENTS

| | | | |
|---|---|---|---|
| 6,418,797 B1 | 7/2002 | Ambrosina et al. | |
| 8,692,139 B2 * | 4/2014 | Aldrich ............... | H02G 15/013 |
| | | | 174/653 |
| 10,594,127 B2 * | 3/2020 | Portillo Gallego .... | H02G 15/04 |
| (Continued) | | | |

FOREIGN PATENT DOCUMENTS

| | | | |
|---|---|---|---|
| EP | 1136804 A2 | 9/2001 | |
| EP | 4358327 A1 * | 4/2024 | .......... H02G 15/007 |
| WO | 2020069774 A1 | 4/2020 | |

OTHER PUBLICATIONS

International Search Report and Written Opinion from PCT Application No. PCT/EP2022/025503, dated Feb. 15, 2023, 12 pages.

*Primary Examiner* — Nguyen Q. Ha
(74) *Attorney, Agent, or Firm* — Stinson LLP

(57) ABSTRACT

A cable gland includes a hub body having a first end configured for attachment to a structure and a second end opposite the first end. The hub body defines an internal passage. A gland nut is configured for attachment to the second end of the hub body to secure a cable in the cable gland. The gland nut defines an internal passage such that the internal passage of the gland nut communicates with the internal passage of the hub body when the gland nut is attached to the hub body. A torque sensor module is mounted to one of the hub body and the gland nut and configured for measuring and indicating a component of an applied torque as a result of attaching the gland nut to the hub body when securing the cable in the cable gland.

20 Claims, 7 Drawing Sheets

(56) References Cited

U.S. PATENT DOCUMENTS

2012/0204658 A1    8/2012  Mercat et al.
2020/0106255 A1*  4/2020  Platt .................. H02G 15/04
2021/0135436 A1    5/2021  Khokle et al.

* cited by examiner

FIG. 5

| Trade Sizes of Glands | Standard Tightening Torque (Lbf-In) |
|---|---|
| 1/2" | 300 |
| 3/4" | 500 |
| 1" | 700 |
| 1-1/4" | 1000 |
| 1-1/2" | 1200 |
| 2" | 1600 |
| 2-1/2" | 1600 |
| 3" | 1600 |
| 3-1/2" | 1600 |
| 4" | 1600 |

CABLE GLAND WITH TORQUE SENSOR

CROSS-REFERENCE TO RELATED APPLICATION

This application claims priority to U.S. Provisional Patent Application Ser. No. 63/263,849, filed Nov. 10, 2021, and which is hereby incorporated by reference in its entirety.

FIELD OF THE DISCLOSURE

The present disclosure generally relates to a cable gland and more particularly to a cable gland having a torque senor to alert users of the torque being applied to the cable gland.

BACKGROUND OF THE DISCLOSURE

Cable glands are used for terminating cable in hazardous and nonhazardous environments. More specifically, cable glands generally provide a means for terminating cables, such as unarmored cables (e.g., TC-type) and armored cables, at junction boxes, control centers, panelboards, enclosures, and the like. Typical cable glands are used to seal the junction between a cable and a device and/or an enclosure into which the cable is extending. Referring to FIG. 1, conventional cable glands 1 may comprise a hub body 3 for interfacing with the device/enclosure, and a gland nut 5 for securing a bushing 7 to the hub body. The bushing 7 is received in the gland nut 5 and seals around and grips the cable for sealing the interior of the gland from the environment. For example, the bushing 7 may seal around a jacket or outer insulation of the cable. In this configuration, the cable gland 1 comprises two main components. Alternatively, conventional cable glands may comprise a hub body for interfacing with the device/enclosure, a union body/sleeve received in the hub body, and a gland nut for securing the union body to the hub body. Therefore, in this configuration, the cable gland comprises three main components.

Cable glands can be used with a range of cable diameters. A contact pressure will vary depending on the size of the cable. In practice, it is recommended to have a contact pressure between the cable and the gland of more than 2 MPa to avoid water ingress. However, in some instances a contact pressure in conventional cable glands can reach up to 15 MPa. Such a high contact pressure may damage the cable jacket causing water ingress after high temperature conditioning/aging. The high contact pressure as a result of over-torqueing the cable gland components may also cause damage to the cable gland threads and sealing elements.

SUMMARY

In one aspect, a cable gland generally comprises a hub body having a first end configured for attachment to a structure and a second end opposite the first end. The hub body defines an internal passage. A gland nut is configured for attachment to the second end of the hub body to secure a cable in the cable gland. The gland nut defines an internal passage such that the internal passage of the gland nut communicates with the internal passage of the hub body when the gland nut is attached to the hub body. A torque sensor module is mounted to one of the hub body and the gland nut and configured for measuring and indicating a component of an applied torque as a result of attaching the gland nut to the hub body when securing the cable in the cable gland.

In another aspect, a torque sensor module for a cable gland generally comprises a contact configured to measure a physical input from attaching a gland nut of the cable gland to a hub body of the cable gland. A sensor element is in electrical communication with the contact for receiving the measured physical input at the contact and converting the physical input into an electrical output indicating a component of an applied torque as a result of attaching the gland nut to the hub body.

BRIEF DESCRIPTION OF THE DRAWINGS

FIG. 5 is a chart illustrating standard torque values for a given gland size.

DETAILED DESCRIPTION OF THE DISCLOSURE

Figure 1:
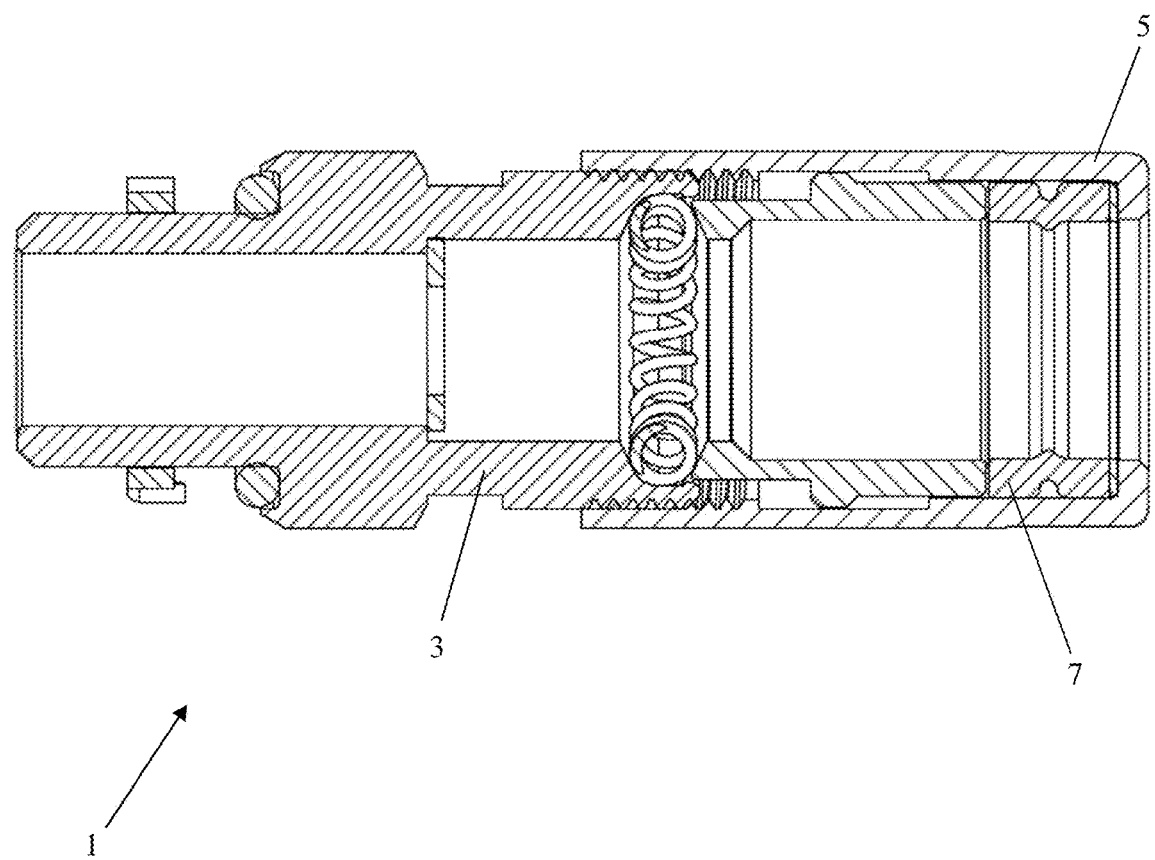
FIG. 1 is cross section of a cable gland of the prior art.

The cable gland described herein has features that, when tightening the components of the cable gland, provide a measurement of the torque being applied to the cable gland and indicate that torque to the user. As such, the user is alerted as to when sufficient torque has been applied to the cable gland to prevent an under or over-torqueing condition from occurring. Therefore, the assembled cable gland provides a secure connection between the components of the cable gland, and between the cable gland and the cable. However, the connection forces between the cable gland components and the cable do not exceed predetermined thresholds which might cause damage to one or both of the cable gland and cable. Additionally, proper electrical contact between the cable and a grounding mechanism of the cable gland is facilitated without extruding the bushing from a gland nut because the proper amount of torque for the gland is communicated to the user. In the illustrated embodiment described below, the cable gland assembly comprises a three-piece design. However, the features of the present disclosure are applicable to cable glands having a two-piece gland design or some other gland design, without departing from the scope of the disclosure.

In the below examples, the cable gland has at least one torque sensor module mounted to a hub body of the cable gland. By measuring components of the torque experienced by the hub body, the amount of torque applied to the cable gland, and subsequently to the cable in the cable gland can be monitored. This enables the user to apply the exact or substantially close to the exact right amount of torque for the cable gland to function as intended. Therefore, a condition in which the cable gland is over-torqued can be identified and/or prevented. As a result, quality control can be implemented across different users of the cable gland. Moreover, the torque applied to the cable gland can be indicated without the use of any additional tools such as a torque-sensing wrench. Thus, the cable gland is in itself equipped to both measure the applied torque and indicate that torque to the user.

Many components of the cable gland may be referred to as having generally cylindrically, circular, annular, or conical features, and as having cylindrical or circular holes, cavities, and openings. Such features may be referred to, or defined by, a circumference, radius, external surface, internal surface, and/or other terms appropriate for defining such features. It should be noted that such features may alternatively be elliptical, polygonal, and the like. As used herein, the terms "axial" and "longitudinal" refer to directions and orientations, which extend substantially parallel to a centerline of the cable gland. Moreover, the terms "radial" and "radially" refer to directions and orientations, which extend substantially perpendicular to the centerline of the cable gland assembly. In addition, as used herein, the terms "circumferential" and "circumferentially" refer to directions and orientations, which extend arcuately about the centerline of the cable gland assembly.

Figure 2:
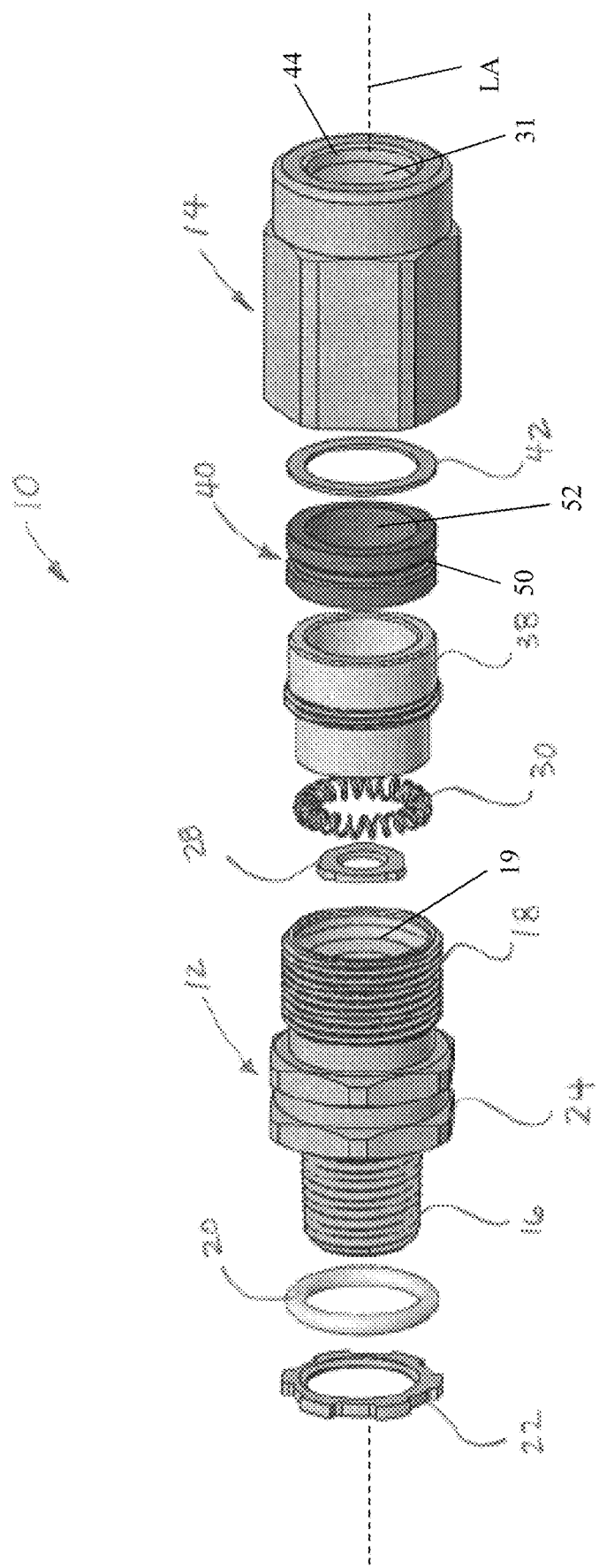
FIG. 2 is an exploded view of a cable gland of the present disclosure.
Figure 3:
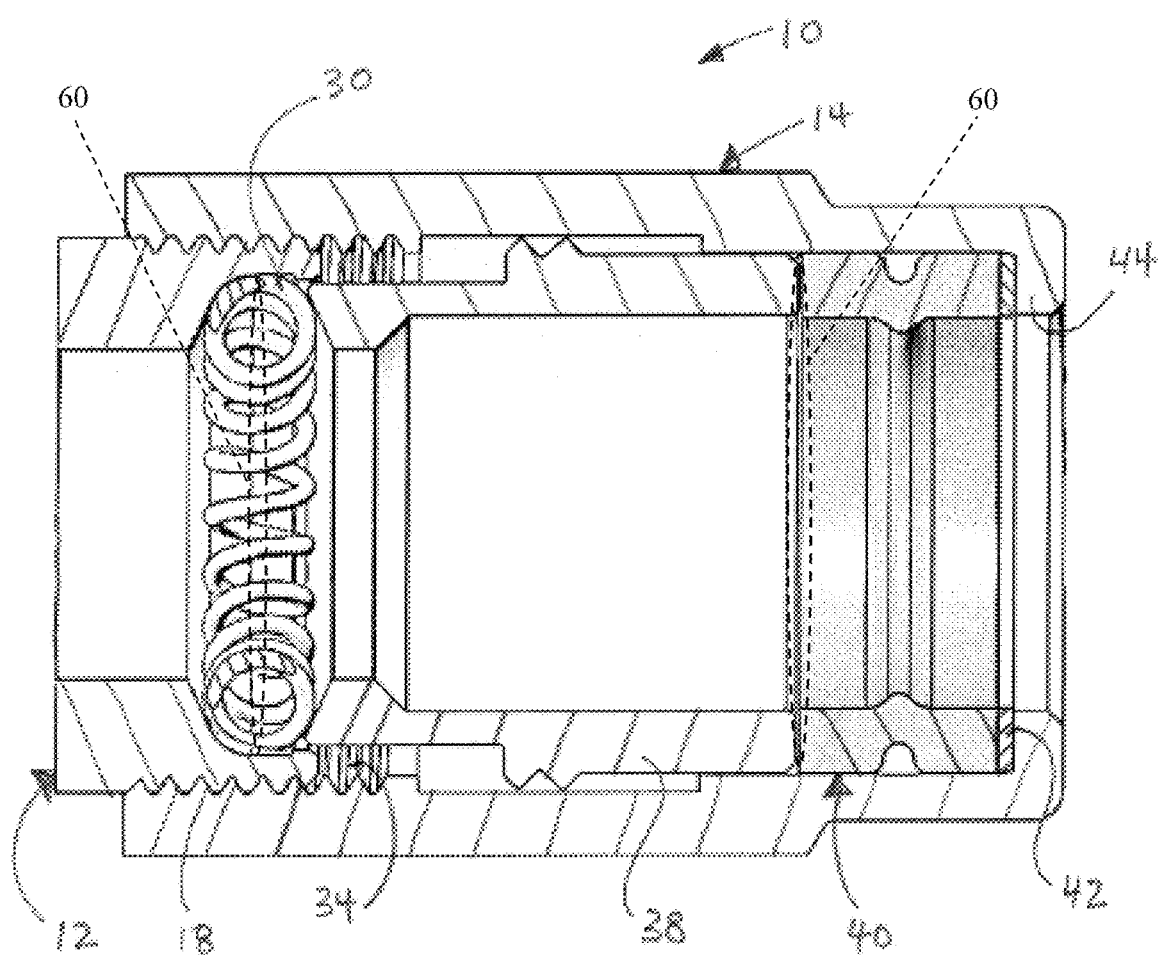
FIG. 3 is a fragmentary longitudinal section of the cable gland in FIG. 2.

Referring to FIGS. 2 and 3, an illustrated embodiment of a cable gland constructed according to the teachings of the present disclosure is generally indicated at reference numeral 10. In general, the cable gland 10 is configured to seal the junction between a cable and a device and/or an enclosure into which the cable is extending. As explained in more detail below, the cable gland 10 includes a sensor that measures and indicates a torque applied to the cable gland. As a result, the cable gland 10 is equipped to alert the user of the torque that has been applied to the gland to prompt the user to adjust the amount of torque as needed to apply a desired amount of torque. For example, a preset range of acceptable torque amount can be programmed into the sensor to alert the user when the torque applied to the cable gland 10 is outside of the preset range. The other components of the cable gland 10, also described below, are illustrative and may be of other designs or constructions.

In general, the cable gland 10 includes a hub body, generally indicated at reference numeral 12, and a gland nut, generally indicated at reference numeral 14. Together, the hub body 12 and the gland nut 14 define a gland body. The hub body 12 has a first end with external connection thread(s) 16 for threading into a device, an enclosure, or other structure, and a second end with an external nut thread 18 for threadably mating with the gland nut 14. The first end of the hub body 12 may be coupled to a cable termination assembly (not shown), such as a junction box, control center, panelboard, enclosure, and the like.

An internal passage 19 extends through the first and second ends of the hub body 12 and is configured to receive a portion of a cable inserted into the cable gland 10. The hub body 12 may comprise or be formed from, for example, a metal, such as aluminum, stainless steel, and/or brass. A face seal 20 and a locknut 22 may be received on the first end of the hub body 20. As installed, the face seal 20 is sandwiched between an exterior face of the device, enclosure, or other structure and a tool coupling portion 24 (e.g., a hexagonal or other polygonal structure) to create the watertight seal and inhibit ingress of water, oil, and/or other debris into the device, enclosure, or other structure. The face seal 20 may comprise or be formed from, for example, silicone, such as a silicone rubber having a durometer of 70 Shore A Hardness. The locknut 22 is threaded on the connection thread 16 within the device, enclosure, or other structure and contacts the interior face of the device, enclosure, or other structure to lock the cable gland 10 to the device, enclosure, or other structure. The locknut 22 may comprise or be formed from, for example, a metal, such as aluminum, stainless steel, and/or brass. In one or more embodiments, the face seal 20 and/or the locknut 22 may be omitted. An armor stop 28 and an annular grounding spring 30 (e.g., garter spring) are received in the passage of the hub body 12, such as at the second end thereof. The armor stop 28 limits the insertion of cable armor of the cable in the cable gland 10. The armor stop 28 may comprise or be formed from, for example, plastic, such as a polyamide (e.g., nylon or nylon 6/6). The grounding spring 30 engages and surrounds the cable armor to create a grounding connection. The grounding spring 30 may comprise or be formed from, for example, metal, such as stainless steel with copper flash coating. The armor stop 28 and the grounding spring 30 may be of other designs and configurations.

The gland nut 14 has an internal passage 31 extending through first and second ends of the gland nut. The internal passages 31, 19 of the gland nut 14 and the hub body 12 are generally alignable with one another to form an internal passage of the gland body that is configured to receive the cable. The first end of the gland nut 14 includes an internal thread(s) (not shown) configured to threadably mate with the external nut thread 18, as shown in FIG. 2. The gland nut 14 may comprise or be formed from, for example, a metal, such as aluminum, stainless steel, and/or brass. By coupling the gland nut 14 to the hub body 12 through a threaded connection, to tighten the gland nut on the hub body, the gland nut can be rotated about a longitudinal axis LA and with respect to the hub body. The tightening of the gland nut 14 on the hub body 12 secures the cable within the cable gland assembly 10 and also establishes a ground path through the cable gland. Additionally, this connection assembly enables the gland nut 14 to be completely removed from the hub body 12 as required or desired.

A sleeve 38, a bushing 40, and a washer 42 are received in the internal passage of the gland nut 14. The bushing 40 is disposed between the sleeve 38 and the washer 42. The bushing 40 comprises a bushing body 50 having a generally annular shape with an interior surface defining a bushing opening 52 extending through first and second ends of the bushing body along an axis of the bushing body. The bushing opening 52 is generally aligned with the internal passage of the gland nut 14 and is configured to receive the cable therein.

When the cable gland 10 is assembled, the sleeve 38 is disposed between and engages the spring 30 and the bushing 40. The sleeve 38 guides compression of the bushing 40, and compression of the spring 30. This compression around the cable provides a retaining force on the cable to prevenient cable pull out and to enable a secure cable gland 10 and cable connection. Additionally, the bushing 40 facilitates a watertight seal on the outer jacket of the cable to reduce or prevent water penetration into the cable gland 10. The sleeve 38 may comprise or be formed from, for example, plastic or metal, such as aluminum, stainless steel, and/or brass. The washer 42 is disposed between the bushing 40 and a shoulder 44 of the gland nut 14 at the second end of the gland nut. The washer 42 distributes the load applied by the shoulder 44 of the gland nut when the cable gland 10 is assembled. The washer 42 is also configured to enable the gland nut 14 to rotate relative to the bushing 40 so that the bushing does not buckle during rotation of the gland nut. In other examples, grease may be used to reduce or prevent bucking of the bushing 40. The washer 42 may comprise or be formed, for example, plastic, such as a polyamide (e.g., nylon or nylon 6/6).

The gland nut 14 and the hub body 12 each include a central opening and are coupled together concentrically such that a cable path traverses the cable gland 10 along the longitudinal axis LA of the cable gland. A cable (not shown)

may be disposed and/or terminated inside the cable path. As described herein, the cable may be an armored cable that includes an outer jacket layer, an armor layer, and at least one conductor. The cable may alternatively be an unarmored cable that includes an outer jacket layer, an insulation layer, and at least one conductor. It should also be appreciated that the cable gland 10 may be used with any other cable layer configuration that enables the assembly to function as described herein.

In operation, the cable gland 10 is configured such that the cable may be retained by tightening the gland nut 14 (e.g., rotating about the longitudinal axis LA) about the hub body 12. When the gland nut 102 is first tightened, a torque load is applied to the cable gland 10 and the grounding spring 30 axially and radially displaces, and compresses around the cable armor, while the bushing 40 remains relatively uncompressed. Once the grounding spring 30 reaches the cable armor (for armored cable types), its compression stops or slows down and at least a portion of the torque load is directed towards the bushing 40. As the torque load is applied to the bushing 40, the bushing is displaced and compresses around the cable jacket. During the compression of the bushing 40, the grounding spring 30 may continue to receive some torque load and further compress a small or no amount.

Figure 4:
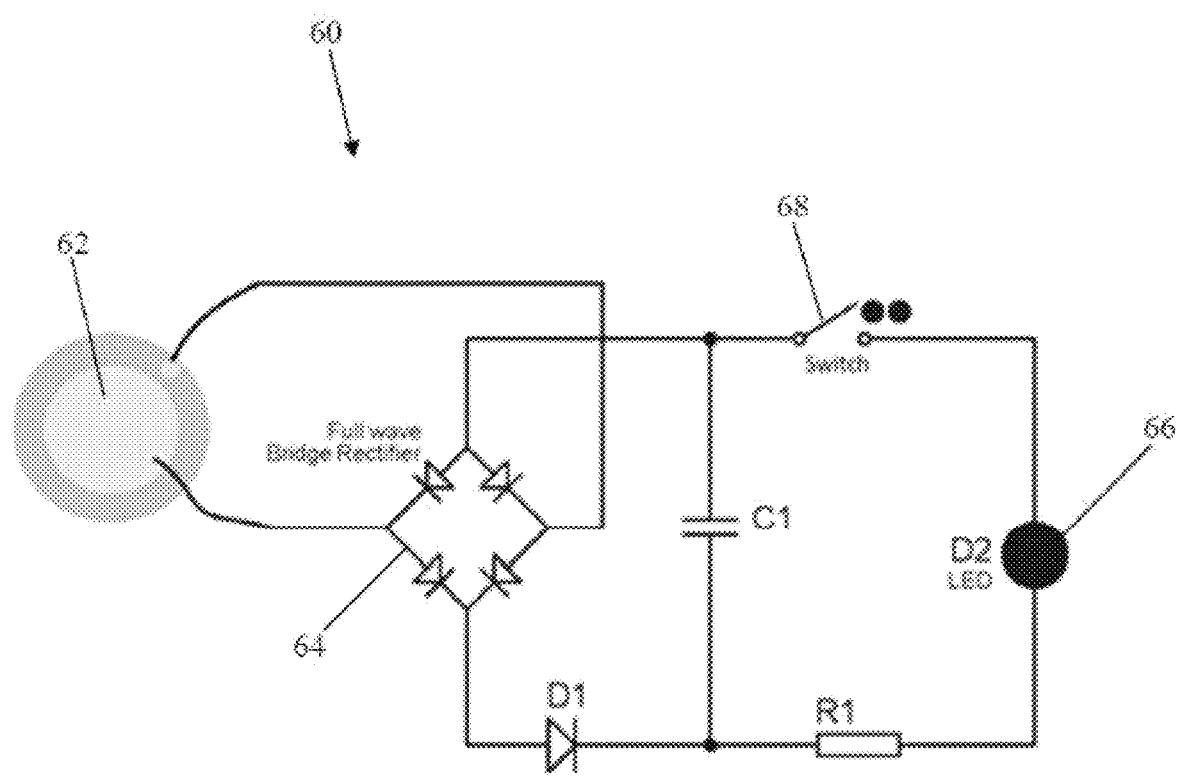
FIG. 4 is a circuit diagram of a torque sensor module.

Referring to FIGS. 3 and 4, a torque sensor module 60 is mounted on the gland body (i.e., hub body 12 or gland nut 14) and is configured to measure and provide an indication of an amount of torque being applied to the cable gland 10 as a result of the gland nut 14 being tightened around the hub body 12 to secure the cable in the cable gland. The torque sensor module 60 comprises an electrical circuit including a contact 62 positioned on the gland body to measure a physical input from the tightening of the gland nut 14 onto the hub body 12, and a sensor element 64 in electrical communication with the contact for receiving the measured physical input at the contact and converting the physical input into an electrical output. In particular, the act of tightening the cable gland 10 may cause a physical displacement of elements of the contact 62 which is sensed by the sensor element 64 and represented by a corresponding voltage output. In one embodiment, the sensor element 64 comprises a transducer (i.e., piezoelectric sensor) configured to convert the physical input into a voltage output. The sensor element 64 may produce a linear response to the torque applied to the cable gland 10 such that the amount of displacement is recorded as a corresponding linear increase in voltage. The circuit further comprises an indicator 66 and a switch 68 disposed between the sensor element 64 and the indicator. In the illustrated embodiment, the indicator 66 comprises one of more lights (e.g., LEDs). However, the indicator 66 could comprises any suitable element for providing a visual, audio, and/or tactile indication without departing from the scope of the disclosure.

When the switch 68 is closed, the sensor element 64 can record the physical displacement of the contact elements and produce a voltage output which is analyzed by the sensor module 60. The sensor module may be configured such that the circuit will activate the indicator 66 when the recorded voltage output is outside of a predetermined voltage range and/or above or below a threshold voltage. For example, the cable gland 10 may be constructed to operate at a predetermined torque range/threshold to ensure that the components are securely fastened without damaging the cable gland or the cable within the cable gland. Therefore, the sensor module 60 can be programmed to activate the indicator 66 if the voltage output corresponding to the applied torque is outside of or deviates from the predetermined torque range/threshold for the cable gland 10. It will be understood that the size, configuration, and utility of the cable gland will impact the optimal torque range/threshold. As such, the sensor module 60 will be configured for the specific cable gland with which it is used. For example, FIG. 5 shows a chart indicating one embodiment of standard torque values for a given gland size. The torque values may be analogous to the voltage thresholds stored in the sensor module 60. As such ranges within a given tolerance of the toque values may be similarly stored in the sensor module 60. It will be understood that other torque values may be utilized without departing from the scope of the disclosure.

Figure 6:
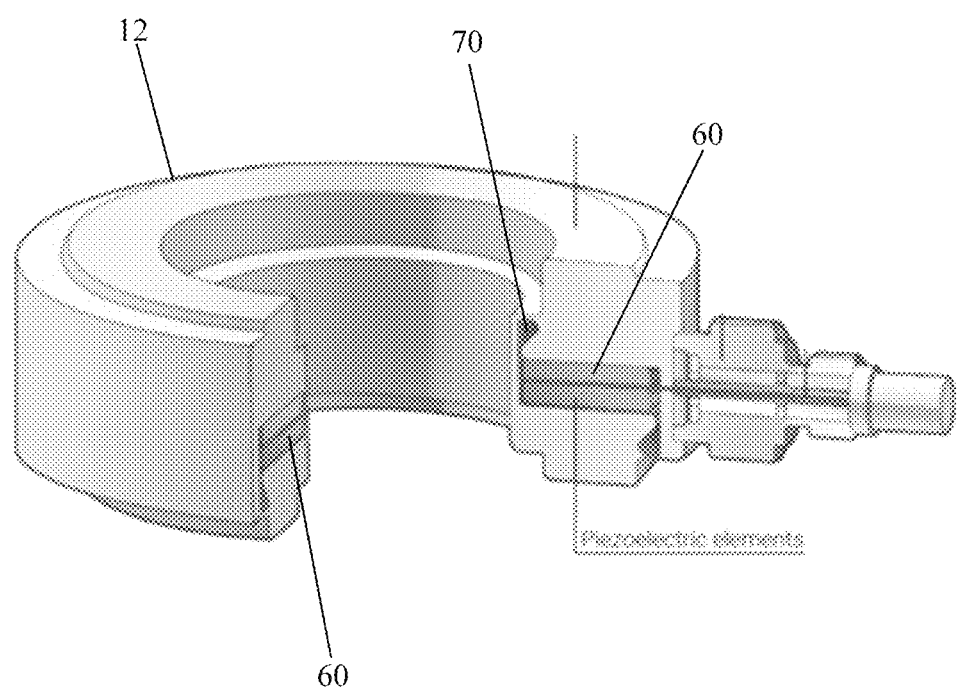
FIG. 6 is a fragmentary perspective of a hub body of the cable gland showing a torque sensor module in a first orientation.

Referring to FIG. 6, a plurality of sensor modules 60 are mounted to the hub body 12 in a first configuration. An interior space 70 in the hub body 12 houses one or more of the sensor modules 60. The sensor modules 60 are spaced circumferentially around the hub body 12 and extend generally radially such that the modules are configured to measure the force vector of the torque applied to the cable gland in an axial direction. In particular, the sensor modules 60 are arranged to measure the axial component of the reactive force arising due to the applied torque to the cable gland 10. This configuration may be particularly useful in cable glands which involve considerable axial movement of the gland nut 14 compared to the radial movement of the sleeve 38 inside the gland body. In the illustrated embodiment, the sensor modules 60 are shown disposed in the interior space 70 of the hub body 12. However, the sensor modules 60 could be disposed at other locations without departing from the scope of the disclosure. For instance, the sensor modules 60 could be located on an interior surface of the hub body 12 such that the modules are disposed between the hub body and the cable when the cable is received in the cable gland 10. Alternatively, the sensor modules 60 could be disposed on or in the gland nut 14. For example, the sensor modules 60 may be disposed between the gland nut 14 and the hub body 12, between the gland nut and the sleeve 38, or between the gland nut and the washer 42. Referring to FIG. 3, the sensor modules 60 may also be located between the sleeve 38 and bushing 40. This location may also be particularly useful for measuring the axial component of the reactive force arising due to the applied torque to the cable gland 10. Still other locations are envisioned.

Figure 7:
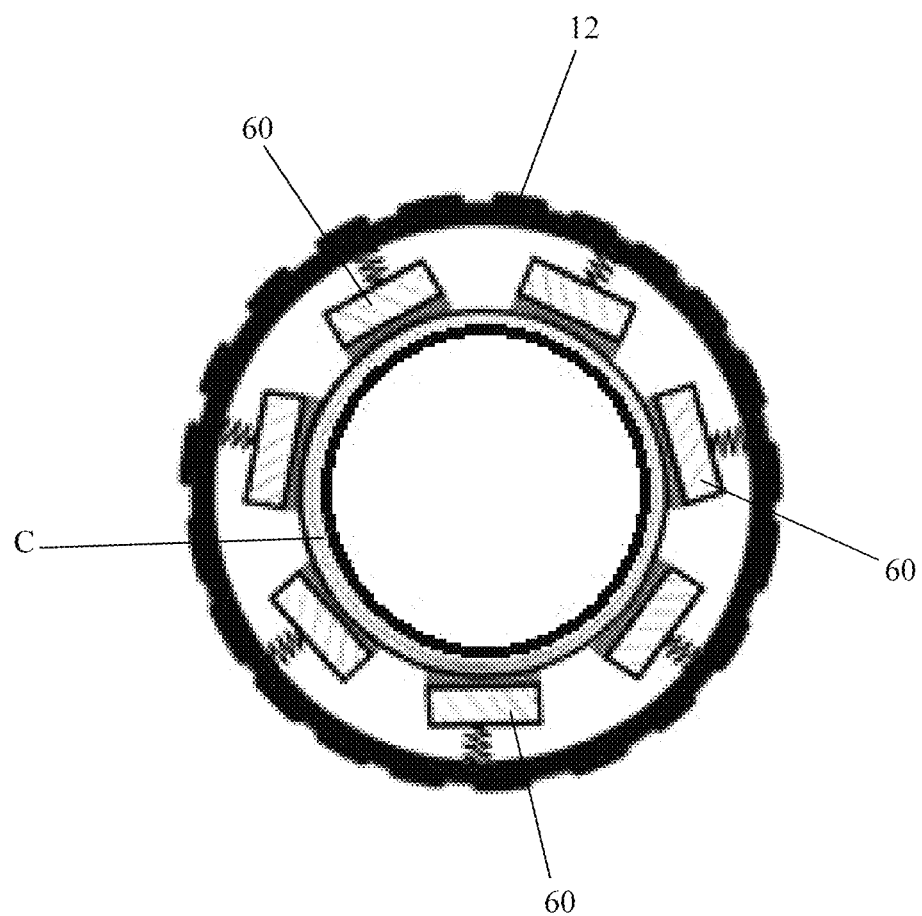
FIG. 7 is a cross section of the hub body showing torque sensor modules in a second orientation.

Referring to FIG. 7, a plurality of sensor modules 60 are mounted to the hub body 12 in a second configuration. The sensor modules 60 are spaced circumferentially around the hub body 12 and extend generally circumferentially such that the modules are configured to measure the force vector of the torque applied to the cable gland 10 in the radial direction. In particular, the sensor modules 60 are arranged to measure the radial component of the reactive force arising due to the applied torque to the cable gland 10. An engagement between the hub body 12 and a cable C received in the hub body is also shown in FIG. 7. The ability of the sensor modules 60 to measure the radial component of the torque applied to the cable gland is schematically represented by the springs which are compressible in the radial direction. This configuration may be particularly useful in cable glands which involve considerable radial movement of the sleeve 38 inside the gland body compared to the axial movement of gland nut 14. In the illustrated embodiment, the sensor modules 60 are shown disposed in the hub body 12. However, the sensor modules 60 could be disposed at other locations without departing from the scope of the disclosure. For instance, the sensor modules 60 could be located on an interior surface of the hub body 12. Referring to FIG. 3, the sensor modules 60 may also be located next to the spring 30 or utilized in replacement of the spring. This location may also be particularly useful for measuring the radial component of the reactive force arising due to the applied torque to the cable gland 10. Alternatively, the sensor modules 60 could be disposed on or in the gland nut 14. For example, the sensor modules 60 may be disposed between the gland nut 14 and the hub body 12, between the gland nut and the sleeve 38, or between the gland nut and the washer 42. Still other locations are envisioned.

In one embodiment, the sensor modules 60 can be wirelessly connected to a remote hub for communicating the torque data to the hub. For instance, sensor module 60 may include or be operatively connected to a transmitter for sending the torque date to the hub. Thus, the amount of torque applied and any instances of under-torqueing or over-torqueing can be recorded by the remote hub.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable gland comprising:
a hub body having a first end configured for attachment to a structure and a second end opposite the first end, the hub body defining an internal passage;
a gland nut configured for attachment to the second end of the hub body to secure a cable in the cable gland, the gland nut defining an internal passage such that the internal passage of the gland nut communicates with the internal passage of the hub body when the gland nut is attached to the hub body; and
a torque sensor module mounted to one of the hub body and the gland nut and configured for measuring and indicating a component of an applied torque as a result of attaching the gland nut to the hub body when securing the cable in the cable gland.

2. The cable gland of claim 1, wherein the torque sensor module provides an indication of when the applied torque is outside of a predetermined range or one of above or below a predetermined threshold.

3. The cable gland of claim 1, wherein the torque sensor module is mounted to the hub body.

4. The cable gland of claim 1, wherein the torque sensor module comprises a piezo electric sensor.

5. The cable gland of claim 1, wherein the torque sensor module is arranged to measure an axial component of a reactive force arising due to the applied torque.

6. The cable gland of claim 1, wherein the torque sensor module is arranged to measure a radial component of a reactive force arising due to the applied torque.

7. The cable gland of claim 1, further comprising a plurality of torque sensor modules circumferentially spaced around the cable gland.

8. The cable gland of claim 1, wherein the torque sensor module comprises a contact configured to measure a physical input from attaching the gland nut to the hub body, and a sensor element in electrical communication with the contact for receiving the measured physical input at the contact and converting the physical input into an electrical output.

9. The cable gland of claim 8, further comprising an indicator electrically connected to the sensor element and configured to provide an indication of when the applied torque is outside of a predetermined range or one of above or below a predetermined threshold.

10. The cable gland of claim 9, wherein the indicator comprises a light.

11. The cable gland of claim 8, wherein the torque sensor module has wireless communication capability for communicating torque data to a remote hub.

12. A torque sensor module for a cable gland comprising:
a contact configured to measure a physical input from attaching a gland nut of the cable gland to a hub body of the cable gland; and
a sensor element in electrical communication with the contact for receiving the measured physical input at the contact and converting the physical input into an electrical output indicating a component of an applied torque as a result of attaching the gland nut to the hub body.

13. The torque sensor module of claim 12, further comprising an indicator electrically connected to the sensor element and configured to provide an indication of when the applied torque is outside of a predetermined range or one of above or below a predetermined threshold.

14. The torque sensor module of claim 13, wherein the indicator comprises a light.

15. The torque sensor module of claim 12, wherein the torque sensor module has wireless communication capability for communicating torque data to a remote hub.

16. The torque sensor module of claim 12, wherein the torque sensor module is configured to be mounted to the hub body of the cable gland.

17. The torque sensor module of claim 12, wherein the torque sensor module comprises a piezo electric sensor.

18. The torque sensor module of claim 12, wherein the torque sensor module is configured to measure an axial component of a reactive force arising due to the applied torque.

19. The torque sensor module of claim 12, wherein the torque sensor module is configured to measure a radial component of a reactive force arising due to the applied torque.

20. The torque sensor module of claim 12, further comprising a plurality of torque sensor modules configured to be circumferentially spaced around the cable gland.

* * * * *